United States Patent
Allende-Blanco et al.

(10) Patent No.: US 7,684,939 B2
(45) Date of Patent: Mar. 23, 2010

(54) METHOD FOR DESIGNING AN ABSORBENT ARTICLE

(75) Inventors: Mel Allende-Blanco, Loveland, OH (US); Brian Bert Anderson, Liberty Township, OH (US); William Handy Hartt, IV, Mason, OH (US); Paul Martin Lipic, West Chester, OH (US); Mattias Schmidt, Idstein (DE); Douglas Gregory Stevens, Blue Ash, OH (US); Bruno Johannes Ehrnsperger, Evendale, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 387 days.

(21) Appl. No.: 11/504,993

(22) Filed: Aug. 16, 2006

(65) Prior Publication Data

US 2008/0046202 A1 Feb. 21, 2008

(51) Int. Cl.
*G01F 1/20* (2006.01)
(52) U.S. Cl. .............................. 702/50; 702/33; 702/51; 702/55
(58) Field of Classification Search ................... 702/19, 702/22, 50, 179, 182, 183, 186; 324/303; 442/415; 700/269; 703/2
See application file for complete search history.

(56) References Cited

U.S. PATENT DOCUMENTS

| | | | |
|---|---|---|---|
| 6,810,300 B1 * | 10/2004 | Woltman et al. | 700/132 |
| 6,891,369 B2 * | 5/2005 | Hurlimann et al. | 324/303 |
| 7,309,189 B2 * | 12/2007 | Khire | 405/129.95 |
| 7,373,284 B2 * | 5/2008 | Stabelfeldt et al. | 703/2 |
| 2004/0253892 A1 * | 12/2004 | Baker et al. | 442/327 |
| 2005/0256686 A1 | 11/2005 | Stabelfeldt et al. | |

FOREIGN PATENT DOCUMENTS

WO    WO 2005/088582 A1    9/2005

OTHER PUBLICATIONS

PCT International Search Report dated Mar. 19, 2003.
"Diapers: Better by Design with CFD" Internet Citation, Online 2000, http://www.hikeytech.com/newsletters/n1208.pdf, retrieved on Aug. 25, 2004.

(Continued)

*Primary Examiner*—Hal D Wachsman
*Assistant Examiner*—Felix E Suarez
(74) *Attorney, Agent, or Firm*—James E. Oehlenschlager

(57) ABSTRACT

A method for designing an absorbent article. The steps of the method are generating a physical spatial map of saturation of a fluid within an absorbent in a physical test environment, generating a virtual spatial map of saturation of a fluid within an absorbent in a virtual test environment, identifying absorbent-fluid interaction properties for the absorbent such that the virtual spatial map of saturation approximates the physical spatial map of saturation, inputting the absorbent-fluid interaction properties into a virtual model of the absorbent article to produce a representation of at least one feature of the absorbent article, evaluating the virtual model of the absorbent article to determine the performance of the at least one feature of the absorbent article, modifying the design of the absorbent article in response to the performance of the at least one feature of the absorbent article determined from the virtual model of the absorbent article.

19 Claims, 7 Drawing Sheets

OTHER PUBLICATIONS

"New Developments in the Assessment of Protective Fabrics Using Computational Models" Hlll R.W. et al., International Nonwovens Journal, Rodman Pub., Ramsey, NJ, US, Dec. 2004, pp. 22-30.

"Computational Fluid Dynamics Modeling of Fabric Systems for Intelligent Garment Design", Barry J. et al., MRS Bulletin, Pittsburgh, US, vol. 28, No. 8, Aug. 2003, pp. 568-573.

U.S. Appl. No. 11/504,992, filed Aug. 16, 2006, Allende-Blanco.

U.S. Appl. No. 11/072,152, filed Mar. 4, 2005, Macura.

"Comparison of relative permeability-saturation-pressure parametric models for infiltration and redistribution of a light nonaqueous-phase liquid in sandy porous media" M. Oostrom et al., Advances in Water Resources 21, No. 2, pp. 145-157, 1998.

"Modeling the hydration of foodstuffs", A.H. Weerts et al., Simulation Modeling Practice and Theory 13 (2005) 119-128.

"NMR Determination of Porous Media Property Distributions", A. Ted Watson et al., Dept. of Chemical Engineering, Colorado State University, Dept. of Chemical Engineering, Texas A&M University, and Engineering Imaging Laboratory, Texas A&M University, Annual Reports on NMR Spectroscopy, vol. 48, 2002, pp. 114-144.

"A Regression-Based Method for Estimating Relative Permeabilities From Displacement Experiments", A.T. Watson et al., SPF Reservoir Engineering, Aug. 1988.

"Modeling the Hydration of Foodstuffs: Temperature Effects", A.H. Weerts, et al., AICHE Journal, May 2003, vol. 49, No. 5, pp. 1334-1339.

"Numerical simulation of the impact of liquid droplets on porous surfaces", Reis Jr. et al., Journal of Computational Physics, 2004, pp. 1-24.

"Computational Modeling of Protective Clothing", James J. Barry et al., INJ Fall 2003, pp. 25-34.

"Unsaturated Hydraulic Conductivity of Two Compacted Barrier Soils", J.S. Meerdink et al., Journal of Geotechnical Engineering, Jul. 1996, pp. 565-576.

"A technique for measuring two-phase relative permeability in porous media via X-ray CT measurements"; J.M. Schmembre et al., Journal of Petroleum Science and Engineering 39 (2003), pp. 159-174.

"Magnetic resonance imaging study of complex fluid flow in porous media: flow patterns and quantitative saturation profiling of amphiphilic fracturing fluid displacement in sandstone cores", S. Steppard et al., Magnetic Resonance Imaging 21 (2003), pp. 365-367.

"Estimation of Porous Media Flow Functions Using NMR Imaging Data", Raghavendra Kulkarni et al., Magnetic Resonance Imaging, vol. 16, Nos. 5/6, pp. 707-709, 1998.

"Determining Fluid Saturations during Multiphase Flow Experiments by NMR Imaging Techniques", Songhua Chen et al., AICHE Journal, Jul. 1994, vol. 40 No. 7, pp. 1238-1245.

"A Regression-Based Method for Estimating Relative Permeabilities From Displacement Experiments", A.T. Watson et al., SPE Reservoir Engineering, Aug. 1988.

"Characterisation of Wetting Heterogeneities in Sandstone Rocks by MRI", G. Guillot et al., Magnetic Resonance Imaging, vol. 12, No. 2, pp. 365-368, 1994.

"Sorption Isotherm Measurements by NMR", Johannes Leisen et al., 2002 Elseivier Science (USA), Solid State Nuclear Magnetic Resonance 22, 409-422 (2002).

"Note Nuclear-magnetic-resonance Imaging of Water Distributions in Loop-pile Nylon Carpet Tiles", J. Text Inst., 1998, 89 Part 1, No. 2, pp. 436-440.

"Quantitative Magnetic Resonance Imaging of Fluid Distribution and Movement in Textiles", Johannes Leisen et al., Textile Research Journal 71(12), 1033-1045 (2001).

"Use of in situ saturation data in estimation of two-phase flow functions in porous media", G.M. Mejia et al., Journal of Petroleum Science and Engineering 12 (1995) 233- 245.

"Characterization of Fluid Distributions in Porous Media by NMR Techniques", Hsie-Keng Liaw et al., AICHE Journal, Feb. 1996, vol. 42, No. 2.

"NMR Determination of Porous Media Property Distributions", A. Ted Watson et al., Annual Reports on NMR Spectroscopy, vol. 48, 2002, pp. 114-144.

"Saturation Gradients in Drainage of Porous Media: NMR Imaging Measurements", E.J. Fordham et al., AICHE Journal, Sep. 1993, vol. 39, No. 9, pp. 1431-1443.

"Utility of NMR T2 Distrubutions, Connection With Capillary Pressure Clay Effect, and Determination of the Surface Relaxivity Parameter", R.L. Kleinberg, Magnetic Resonance Imaging, vol. 14, Nos. 7/8, pp. 761-767, 1996, pp. 761-767.

"Quantitative Magnetic Resonance Imaging of Fluid Distribution and Movement in Textiles", Johannes Leisen et al., Textile Research Journal, Dec. 2003; 71, 12; ProQuest Science Journals, 2001, pp. 1033-1045.

"Richards: Computer Program for the Numerical Simulation of One-Dimensional Infiltration Into Unsaturated Soil", G. Gattardi et al., Computer & Geosciences, vol. 19, No. 9, pp. 1239-1266, 1993.

"Inverse modeling of a radial multistep outflow experiment for determining unsaturated hydraulic properties", Stefan Finsterle et al., Advances in Water Resources, vol. 22, No. 5, pp. 431-444, 1999.

"A comparison of numerical solutions of the one-dimensional unsaturated-saturated flow and mass transport equations", M. Th. Van Genuchten, Adv. Water Resources, 1982, vol. 5, March, pp. 47-55.

"Capillary Conduction of Liquids Through Porous Mediums", L. A. Richards; Physics, vol. 1, Nov. 1931, pp. 318-333.

"Characterizing Porous media with NMR methods", A. Ted Watson et al., Progress in Nuclear Magnetic Resonance Spectroscopy 31 (1997) pp. 343-386.

"Coupled heat air and moisture transfer in building structures", P. Haupl et al., Int. J. Heat Mass Transfer, vol. 40 No. 7, pp. 1633-1642, 1997.

"Spatio-temporal modeling of the soil water balance using a stochastic model and soil profile descriptions", Marc F.P. Bierkens, Geoderma 103 (2001) pp. 27-50.

"Simulating unsaturated flow and transport in a macroporous soil to tile drains subject to an entrance head: model development and preliminary evaluation", A. Kohler et al., Journal of Hydrology 254 (2001) pp. 67-81.

"A transport model for swelling of polyelectrolyte gels in simple and complex geometries", E.C. Achilleos et al., Computational and Theoretical Polymer Science 11 (2001) pp. 63-80.

"Absorption of water by fiber webs: an illustration of diffusion transport", H.V. Nguyen et al., Tappi Journal, Dec. 1983, pp. 76-79.

"Determining permeability of tight rock samples using inverse modeling", Stefan Finsterle et al., Water Resources Research, vol. 33, No. 8, pp. 1803-1811, Aug. 1997.

* cited by examiner

US 7,684,939 B2

METHOD FOR DESIGNING AN ABSORBENT ARTICLE

FIELD OF THE INVENTION

The present invention relates to a method for designing an absorbent article.

BACKGROUND OF THE INVENTION

Designers of absorbent articles have traditionally relied upon results from physical testing of prototypes to evaluate the performance of absorbent articles and as a basis for making design changes. Developing prototypes of absorbent articles can be expensive because the equipment necessary to manufacture the absorbent article may not be developed at the time when new absorbent articles are being designed. In some instances, the materials from which the absorbent article will be constructed have yet to be developed. Furthermore, physical testing often requires working in a controlled laboratory environment, which can be expensive. In the case of hygienic products, such as catamenial devices, wound dressings, facial tissue, diapers, and diaper wipes, laboratory personnel may be exposed to increased risks to their health as a result of handling animal exudates during laboratory tests. For absorbent articles designed to absorb other materials, physical testing may require that laboratory personnel be exposed to unhealthy chemicals that the absorbent article is designed to absorb.

Obtaining data describing the transient behavior of absorbent articles can be challenging. Often, a designer of absorbent articles is interested in how the absorbent article being designed acquires fluid at the onset of exposure to a fluid. By the time the designer removes the absorbent article from exposure to the fluid, dissects the absorbent article, emplaces portions of the absorbent article in a device capable of measuring distribution of fluid, and measures the distribution of the fluid, the distribution of the fluid can change significantly as compared to the distribution of fluid when the absorbent article was removed from contact with the fluid.

In some design processes for designing absorbent articles based on physical testing, physical testing on replicates of absorbent articles is needed to deduce conclusions based on observed results from testing. Testing replicates can help reduce uncertainty in making evaluations of different designs for absorbent articles and making decisions on how to improve design of an article. Creating prototypes that are precise replicates of one another can be challenging. When prototypes are not precise replicates of one another, interpreting testing results can be more difficult.

Absorbent articles are often designed to absorb a variety of substances. The substance may be a fluid comprised of a single constituent such as water. The substance may be a multi-phase fluid such as animal menses or bowel movement material. Physical testing of prototypes of absorbent articles exposed to substances comprised of multiple components in multiple phases can be problematic because the designer of the absorbent article may be unable to identify the particular impacts of specific phenomena on the performance of the absorbent article. Furthermore, the testing equipment used to test absorbent articles is often designed to test the absorbency with respect to clean water, rather than a substance containing a variety of solid, fluid, and gaseous phases.

The fluid transport properties of absorbent materials commonly used in absorbent articles can be difficult to measure. Key fluid transport properties, which partially describe interactions between the absorbent and fluid, include the capillary pressure versus saturation function and the relative permeability function. Most commonly used methods for measuring the absorbent-fluid interaction properties are not suitable for testing with fluids other than water.

There is a continuing unaddressed need for methods for developing absorbent articles that integrates physical measurements of the absorbent properties of absorbent materials into the design process.

Additionally, there is a continuing unaddressed need for virtual product development methods that allow the product developer to gather data on the transient performance of an absorbent article.

Further, there is a continuing unaddressed need for methods for developing absorbent articles that do not rely entirely on physical testing of prototypes.

There is also a continuing unaddressed need for product designers to be able to test absorbent materials and designs for absorbent articles without having to expose personnel to the substances absorbent articles are designed to absorb.

Furthermore, there is a continuing and unaddressed need for methods for measuring the capillary pressure versus saturation function for fluids other than water.

SUMMARY OF THE INVENTION

A method for designing an absorbent article is disclosed. One of the steps comprises generating a physical spatial map of saturation of a fluid within an absorbent in a physical test environment. Another step comprises generating a virtual spatial map of saturation of a fluid within an absorbent in a virtual test environment. Another step comprises identifying absorbent-fluid interaction properties for the absorbent such that the virtual spatial map of saturation approximates the physical spatial map of saturation. Another step comprises inputting the absorbent-fluid interaction properties for the absorbent into a virtual model of the absorbent article to produce a representation of at least one feature of the absorbent article. Another step comprises evaluating the virtual model of the absorbent article to determine the performance of the at least one feature of the absorbent article. Another step comprises modifying the design of the absorbent article in response to the performance of the at least one feature of the absorbent article determined from the virtual model of the absorbent article. The method can further comprise the step of inputting the absorbent-fluid interaction properties into a virtual model of the absorbent article having a modified design and re-performing the step of evaluating the virtual model of the absorbent article to determine the performance of the at least one feature of the absorbent article.

The physical spatial map of saturation can be generated with measurements made using a noninvasive technique selected from the group consisting of nuclear magnetic resonance spectroscopy, X-ray imaging, autoporosimetry, and gravimetric analysis.

The absorbent-fluid interaction properties can be selected from the group consisting of the capillary pressure versus saturation function, relative permeability function, saturated permeability, irreducible fluid saturation, maximum fluid saturation, and $P_o$. The capillary pressure versus saturation function can be characterized using a modified van Genuchten function. The relative permeability function can be characterized using the van Genuchten-Mualem model. The fluid can be selected from the group consisting of water, artificial menstrual fluid, menstrual fluid, synthetic vaginal discharge, vaginal discharge, synthetic urine, urine, fluid from a bowel movement, bowel movement analog, sweat, synthetic sweat, a substance used for skin care, a lubricant, a surfactant, a cleanser, a detergent, a beverage, a petroleum-based product, a solvent, and vomit.

The absorbent article can be a catamenial device comprising a topsheet, a backsheet, and an absorbent core disposed between the topsheet and backsheet. The absorbent article can be a diaper. The absorbent article can dispense a substance. The absorbent article can be selected from the group consisting of pull-on diapers, training pants, incontinence products, feminine wipes, diaper wipes, floor wipes, countertop wipes, body wipes, toddler wash wipes, bath tissues, breast pads, paper towels, toilet paper, facial tissue, wound dressings, handkerchiefs, household wipes, foam, and chamois.

The steps of inputting the absorbent-fluid interaction properties for the absorbent into a virtual model of the absorbent article to produce a representation of at least one feature of the absorbent article, evaluating the virtual model of the absorbent article to determine the performance of the at least one feature of the absorbent article, and modifying the design of the absorbent article in response to the performance of the at least one feature of the absorbent article determined from the virtual model of the absorbent article can be performed iteratively by a software program.

The absorbent can be selected from the group consisting of nonwovens, wovens, apertured polymer films, cellulosic materials, thermoplastic materials, air laid materials, sponges, absorbent gelling materials, foams, rayon, cotton, airfelt, creped cellulose wadding, meltblown polymers, and peat moss.

The method for designing an absorbent article can comprise the steps of generating a physical spatial map of saturation of a fluid within an absorbent in a physical test environment, identifying absorbent-fluid interaction properties for the absorbent, inputting the absorbent-fluid interaction properties for the absorbent into a virtual model of the absorbent article to produce a representation of at least one feature of the absorbent article, evaluating the virtual model of the absorbent article to determine the performance of the at least one feature of the absorbent article, and modifying the design of the absorbent article in response to the performance of the at least one feature of the absorbent article determined from the virtual model of the absorbent article.

DETAILED DESCRIPTION OF THE INVENTION

As used herein "absorbent article" refers to a device or implement that has the capacity to uptake and/or release a fluid. Non-limiting specific examples of absorbent articles include absorbent articles worn next to the human body, in particular sanitary napkins, panti-liners, interlabial pads, tampons, diapers, pull-on diapers, training pants, incontinence products, wound dressings, and the like. Other non-limiting specific examples of absorbent articles include paper towels, facial tissue, diaper wipes, floor wipes, countertop wipes, body wipes, toddler wash wipes, bath tissues, toilet paper, handkerchiefs, feminine wipes, breast pads, household wipes, foam, and chamois.

As used herein "fluid" refers to a substance that may be absorbed into an absorbent article. Non-limiting specific examples of a fluid include water, artificial menstrual fluid, menstrual fluid, vaginal discharge, synthetic vaginal discharge, urine, synthetic urine, bowel movement fluids, bowel movement analogs, sweat, synthetic sweat, hexadecane, silicone oil, aqueous carbopol, and mineral oil. Additional non-limiting specific examples of a fluid also include a substance used for skin care, a lubricant, a surfactant, a cleanser, a detergent or other substance for which an absorbent article can be used to release or dispense a substance. Non-limiting specific examples of a fluid also include substances commonly spilled such as beverages, petroleum-based products, solvents, and vomit.

As used herein "saturation" refers to the fraction of the void space in an absorbent filled by the fluid. Saturation can be reported as a percentage or in decimal form.

As used herein "catamenial device" refers to a device used to manage menstruation. Catamenial devices include, but are not limited to, devices such as tampons, sanitary napkins, interlabial pads, and panti-liners.

As used herein, "heterogeneous" refers to a material comprised of more than one constituent or ingredient.

As used herein, "anisotropic" refers to materials having properties measured in one direction that differ from properties measured in another direction.

Absorbent articles can be constructed from a single absorbent material or from multiple absorbent materials arranged in various configurations including laminated structures.

Figure 1:
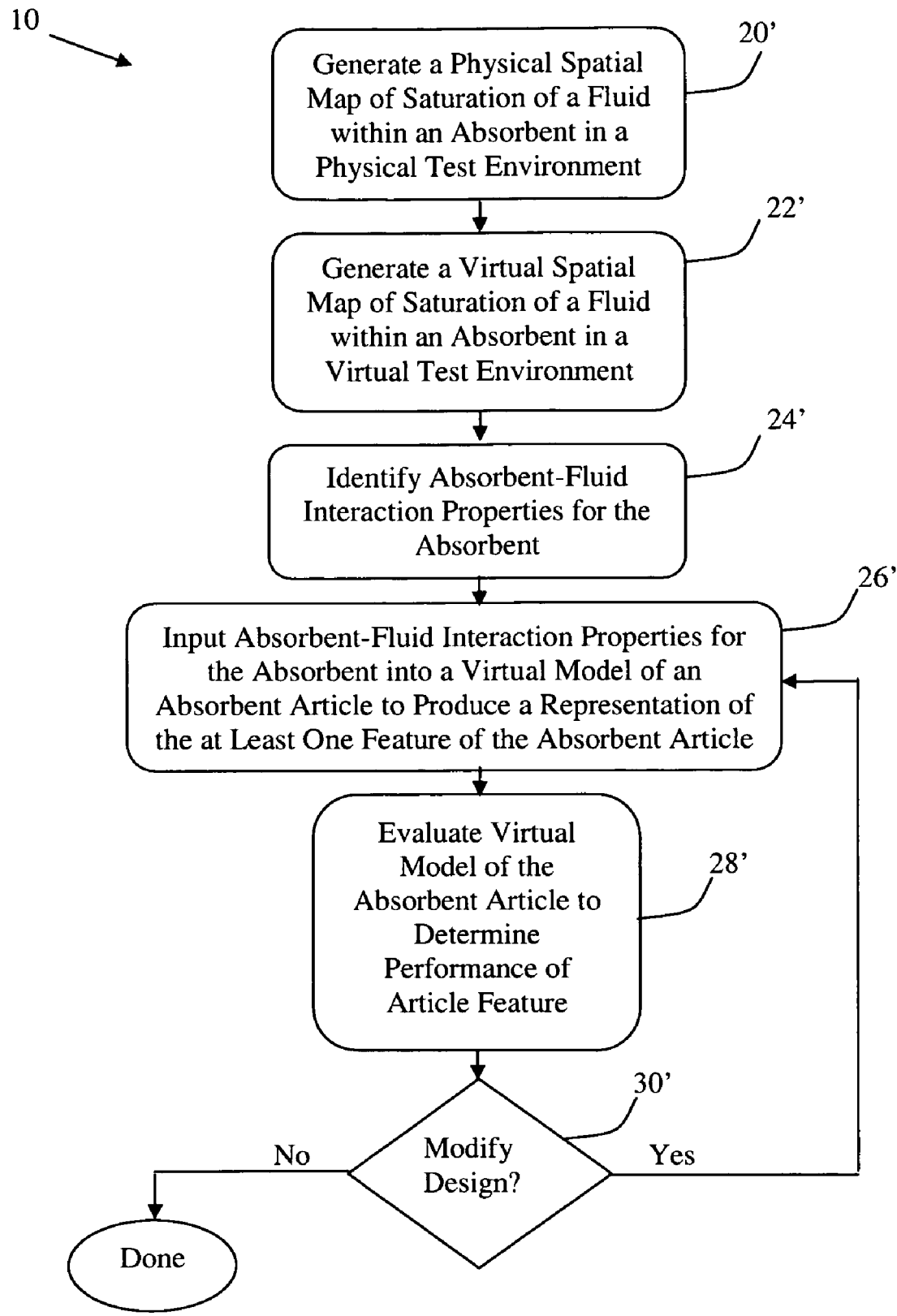
FIG. 1 is a flow chart of a method for designing an absorbent article.

FIG. 1 is illustrative of method 10 for designing an absorbent article. The method 10 can be used to develop a design for an absorbent article having the desired performance. As used herein, examples of specific equipment, computer software, materials, and products are used for illustrative purposes only and other particular items may be used without departing from the scope of the present invention.

In one embodiment, method 10 includes generating a physical spatial map of saturation of a fluid within an absorbent in a physical test environment 20 at step 20'. The physical test environment 20 can be a laboratory in which tangible absorbent materials are tested.

Saturation of the absorbent can be measured using noninvasive test methods. Noninvasive test methods do not require contact between the device used to make a measurement and the interior of the object upon which the measurement is made. Measurements may be direct measurements or indirect measurements inferred from some other measured property.

Saturation of the absorbent can be measured using any method known in the art including, but not limited to, nuclear magnetic resonance spectroscopy (NMR) (see Sheppard et al. (2003), "Magnetic Resonance Imaging Study of Complex Fluid Flow in Porous Media: Flow Patterns and Quantitative Saturation Profiling of Amphiphilic Fracturing Fluid Displacement in Sandstone Cores," *Magnetic Resonance Imaging*, 21, 365-367, Elsevier Inc.), autoporosimetry (see Miller, B. and Tyomkin (1994), "I., Liquid Porosimetry: New Methodology and Applications," *J. of Colloid and Interface Science*, 162, 163-170, TRI/Princeton, Princeton, N.J.), or X-ray imaging (see Ring et al. (1995), "Fluid Distribution: Comparison of X-Ray Imaging Data," *Nonwoven World*, Summer 1995.

An analysis that can be used for generating a virtual spatial map of saturation of a fluid within an absorbent in a virtual test environment 22 corresponding to the physical test environment 20 is performed in step 22' of method 10. Information needed to conduct the analysis that can be used for generating a virtual spatial map of saturation of a fluid 50 within an absorbent 100 in the virtual test environment 22 in step 22' can be gathered from measurements made in the physical test environment 20 in which saturation of the absorbent 100 is physically spatially mapped. Additional information needed can be gathered from material property databases, material suppliers, material property handbooks, and similar sources of information. The virtual environment for generating a virtual spatial map of saturation of a fluid within an absorbent in a virtual test environment 22 corresponding to the physical test environment 20 can be created using numerical analysis tools known in the art including, but not limited to, finite element method, finite difference method, finite volume method, quasi-analytical methods, boundary element method, and mixed methods combining two or more numerical method techniques. Data and information required to generate a virtual spatial map of saturation of a fluid within an absorbent in a virtual test environment are translated into a language intelligible to a computer and entered into a computer system 200.

In step 24' of method 10, the absorbent-fluid interaction properties for the absorbent are identified such that the virtual spatial map of saturation in the virtual test environment 22 approximates the physical spatial map of saturation of the absorbent in the physical test environment 20. Rational means for comparing a physical spatial map of saturation measured in the physical test environment 20 to a virtual spatial map of saturation generated in the virtual test environment 22 include mathematically rigorous techniques such as least squares error reduction. Non-mathematical approaches, such as comparing maps of saturation based on visual examination by a person skilled in the art in analyzing noisy data, who makes a judgment regarding how well the maps of saturation compare, are also acceptable. Data and information required to identify absorbent-fluid interaction properties for the absorbent are translated into a language intelligible to a computer and entered into a computer system 200.

Once the absorbent-fluid interaction properties are known to a sufficient level of certainty, the absorbent-fluid interaction properties are input into a virtual model of the absorbent article 26 in step 26' of method 10. The virtual model of the absorbent article 26 can be used to calculate the virtual spatial map of saturation of the absorbent article when insulted by a fluid. Data and information required to produce a representation of the at least one feature of the absorbent article are translated into a language intelligible to a computer and entered into a computer system 200.

The virtual model of the absorbent article 26 is evaluated in step 28' to determine the performance of the at least one feature of the absorbent article. The designer can select the at least one feature of the absorbent article for evaluation from performance criteria known to those skilled in the art of designing absorbent articles including, but not limited to, absorbency, strikethrough, re-wet, and retention under pressure. The designer can also establish or define what is an acceptable performance for the at least one feature of the absorbent article based on industry standards, regulatory standards, standards internal to the entity selling the absorbent article 26. The designer can also make up an entirely new performance criteria for absorbent articles that are informative to the designer.

If the desired performance level of the at least one feature is met, then the designer is done. If the desired performance level of the at least one feature of the absorbent article is not met or if additional testing of the virtual model of the absorbent article 26 is desired, the design of the absorbent article can be modified in step 30'. After modifying the design of the absorbent article, the steps of inputting absorbent-fluid interaction properties for the absorbent into a virtual model of the absorbent article 26 in step 26' and evaluating the virtual model in step 28' can be repeated to determine the performance of the at least one feature. Alternatively, a software program may be used to perform an iterative process to identify a design for the absorbent article that yields the desired results.

Once an acceptable design for the absorbent article has been identified based on the virtual model of the absorbent article 26, a physical prototype incorporating the design elements of the virtual model can be created.

The method can be used to design and evaluate any absorbent article. For the purposes of describing the method presented herein, the method is described with respect to absorbent articles worn next to the human body, in particular sanitary napkins, panti-liners, interlabial pads, diapers, and the like. These absorbent articles can be comprised of a topsheet, a backsheet, and an absorbent core disposed between the topsheet and the backsheet and may include a secondary topsheet and a secondary absorbent core. However, it is understood that the method can be used to design other absorbent and/or dispensing articles including tampons, incontinence products, wound dressings, paper towels, toilet paper, handkerchiefs, facial tissue, diaper wipes, feminine wipes, breast pads, household wipes, chamois, floor wipes, countertop wipes, body wipes, toddler wash wipes, bath tissues, and the like. The absorbent articles for which the method is applicable can be reusable in that the absorbent articles can be used more than one time.

The absorbent can be a nonwoven material or an apertured polymer film. The absorbent can be materials comprised of cellulose fibers and/or thermoplastic fibers. The absorbent can be airlaid materials. The absorbent can be foams, absorbent sponges, and absorbent gelling materials. The absorbent can be comprised of bicomponent fibers that are formed from at least two different polymers extruded from separate extruders and spun together to form one fiber. The absorbent can be comprised of biconstituent fibers that are formed from at least two polymers extruded from the same extruder as a blend. The absorbent can be treated with a surfactant. The absorbent can be a mixture of pulp fibers and absorbent gelling material. The absorbent can be pulp alone. The absorbent can be absorbent gelling material alone. The absorbent can be rayon, cotton, or comminuted wood pulp which is generally referred to as airfelt. The absorbent can be creped cellulose wadding, meltblown polymers, or peat moss. The absorbent can be a topsheet, secondary topsheet, fluid distribution layers, or absorbent core used in catamenial devices, diapers, and incontinence devices.

Figure 2:
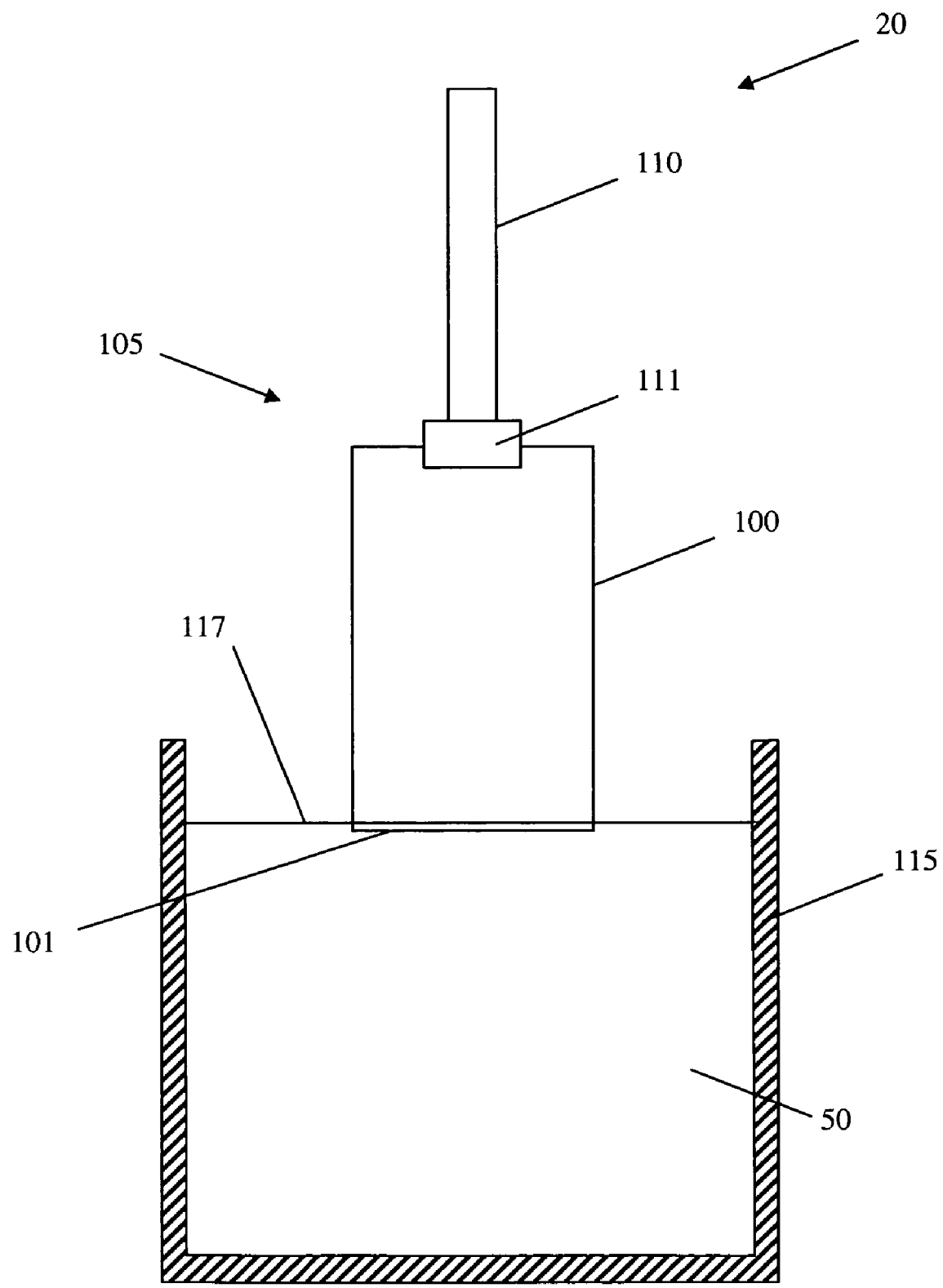
FIG. 2 is a physical test environment test apparatus.

One tool for generating a physical spatial map of saturation of a fluid within an absorbent in a physical test environment 20 is nuclear magnetic resonance spectroscopy (NMR). A physical test environment 20 is shown in FIG. 2. A simple testing apparatus 105 that can be used in a NMR spectroscopy device can be constructed with a wooden dowel rod 110 or other means for supporting the absorbent 100 and tape 111 or other means for attaching the absorbent 100 to dowel rod 110. Other means supporting the absorbent 100 include materials which can be placed in a NMR spectroscopy device. Other means for attaching the absorbent 100 to dowel rod 110 include clamping, tacking, gluing, and other means which can be used in an NMR spectroscopy device.

The absorbent 100 can be attached to the wooden dowel rod 110 with tape 111 such that the absorbent 100 can be suspended above a reservoir of fluid 115 and lowered into the reservoir of fluid 115 in discrete steps. The absorbent 100 can be a testing coupon, which is a sample or specimen of the absorbent 100, that is about 5 to about 50 mm wide, about 0.1 to about 10 mm thick, and about 10 to about 100 mm long in the direction in which the absorbent 100 is lowered into the reservoir of fluid 115. The reservoir of fluid 115 can be contained in a common 100-500 ml laboratory test tube or contained in a custom designed and built device suitable for use in a NMR spectroscopy device. A small amount of an additive for enhancing signal intensity for NMR spectroscopy can be mixed with the fluid 50. MAGNAVIST®, manufactured by Berlex Canada, in a fraction by volume of 0.5% can be used to enhance signal intensity. The testing apparatus 105 is placed within the NMR spectroscopy device. Suitable NMR spectroscopy devices include, but are not limited to, a BRUKER AVANCE DSX 300 Widebore and BRUKER BIOSPEC AVANCE 4.7T/60, available from Bruker, Germany. The fluid 50 can be synthetic urine comprised of 0.9% by weight sodium chloride solution, JAYCO SYNURINE available from Jayco Pharmaceuticals Company of Camp Hill, Pa., or any other fluid for which absorbent articles are used to absorb.

To generate a physical spatial map of saturation of a fluid, such as artificial menstrual fluid, within an absorbent in a physical test environment 20, a BRUKER DMX 300 spectrometer operating at a 1H frequency of 300.1 MHz with a standard BRUKER 38.0 mm RF imaging coil or a BRUKER BIOSPEC 4.7/60 operating at a 1H frequency of 200.4 MHz with a BRUKER 24 cm RF imaging coil can be used. Data for generating the physical spatial map of saturation can be acquired using two-dimensional multi-spin-multi-echo imaging experiments. The artificial menstrual fluid can be doped with Gadolinium (0.5% MAGNAVIST®) to permit fast repetition time imaging.

The absorbent 100 can be lowered into the reservoir of fluid 115 in discrete steps. When the absorbent 100 is lowered into the reservoir of fluid 115, the absorbent 100 absorbs fluid 50 from the reservoir of fluid 115. As the absorbent 100 absorbs fluid 50 from the reservoir of fluid 115, the piezometric surface 117 of fluid 50 becomes lower. When the absorbent 100 has absorbed enough fluid 50 such that the piezometric surface 117 of fluid 50 falls just below the lower end 101 of the absorbent 100 and the absorbent 100 and fluid 50 are no longer in contact with one another, contact between the absorbent 100 and fluid 50 is broken. The magnitude of the lowering step can be a function of the absorbency of the absorbent 100, with respect to the fluid 50 tested, the volume of the absorbent 100, and the cross sectional area of the reservoir of fluid 115. For a test tube having a diameter of approximately 25 mm and an absorbent 100 comprising 82% cellulose fiber pulp, 18% bicomponent synthetic fiber, and a minimal amount of latex binder, absorbent 100 can be lowered into the reservoir of fluid 115 in discrete 1±0.5 mm increments and contact between the absorbent 100 and fluid 50 breaks within about 30 seconds of lowering. Alternatively, the absorbent 100 can be stationary and the reservoir of fluid 115 can be raised in discrete steps to come into contact with the absorbent 100. The absorbent 100 and reservoir of fluid 115 can both be stationary and the level of fluid 50 in the reservoir of fluid 115 can be raised by injecting fluid 50 into the reservoir of fluid 115 through a tube connected to or placed in the reservoir of fluid 115.

Figure 3:
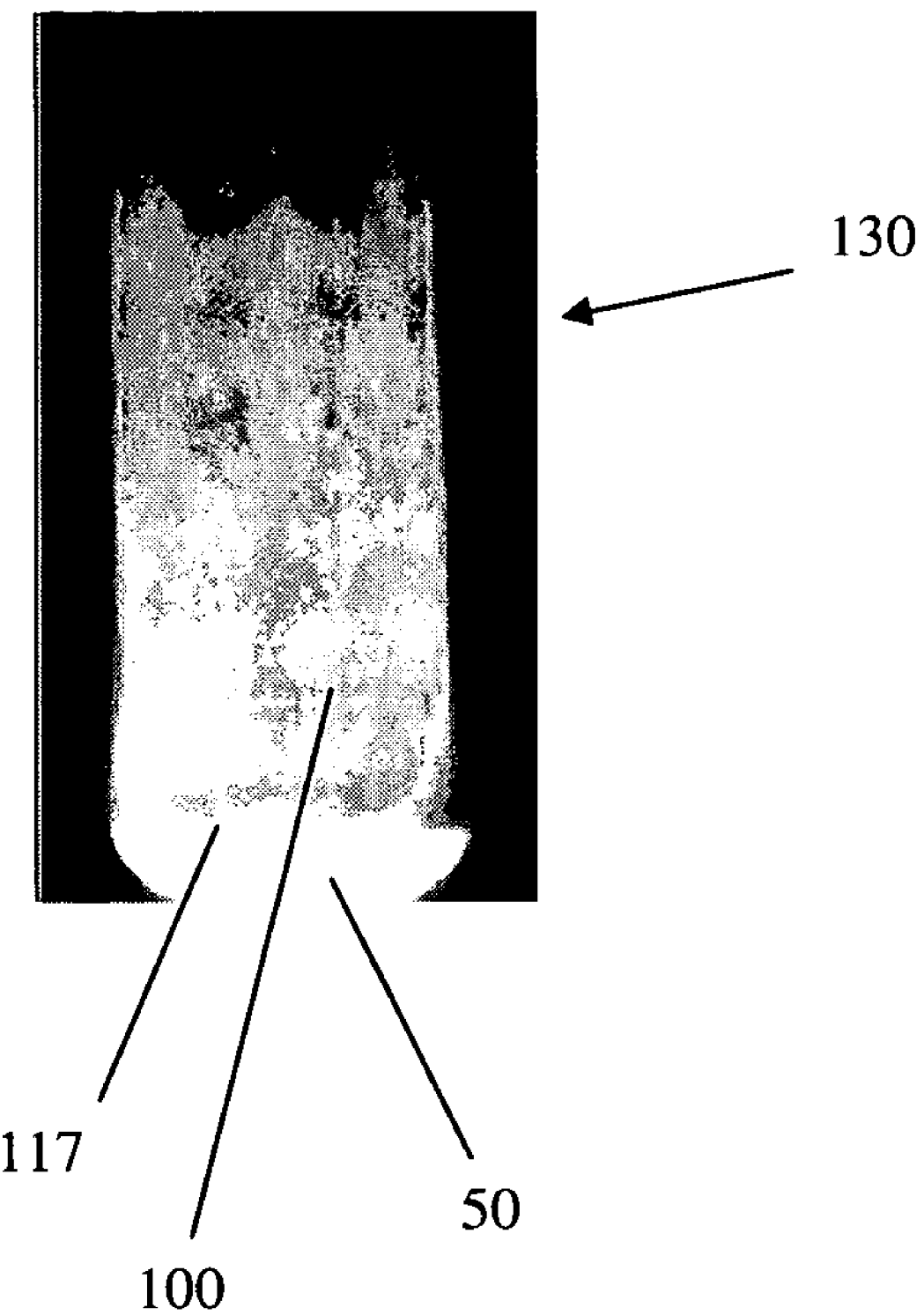
FIG. 3 is a proton image in plane view.

When contact between the absorbent 100 and fluid 50 breaks and fluid in the absorbent has reached equilibrium, a one-dimensional or two-dimensional proton image 130 can be taken of the reservoir of fluid 115, fluid 50, and the absorbent 100 using image capturing software and methods standard with an NMR spectroscopy device. An example of what a typical proton image 130 looks like is shown in FIG. 3. The proton image 130 is used in subsequent data reduction. After the proton image 130 is recorded, the absorbent 100 can be lowered into the fluid 50 by the next increment and the process can be repeated. The test can be terminated at any time. Typically the test is terminated when the absorbent 100 is lowered into the fluid 50 and the absorbent 100 is unable to absorb a sufficient volume of fluid 50 to cause a break in contact between the absorbent 100 and fluid 50. A final proton image 130 can be collected prior to removing the testing apparatus from the NMR spectroscopy device. Alternatively, the absorbent 100 can be removed from the reservoir of fluid 115 and a proton image 130 can be taken.

Alternatively, one or more one-dimensional or two-dimensional proton images 130 can be taken as the absorbent 100 absorbs the fluid 50 before the absorbent 100 has reached equilibrium.

Using computer software that accompanies the NMR spectroscopy device, a line can be selected on each proton image 130 recorded from the NMR spectroscopy device and a data file that is descriptive of the signal intensity as a function of location along the specified line can be created. The piezometric surface 117 of the fluid 50 can be identified on the proton image 130 as the location where the signal intensity measured by the NMR spectroscopy device is significantly higher than the signal intensity reflected by the absorbent 100. The zero point on the specified line can be taken to be at the piezometric surface 117 of the fluid 50.

The signal intensity measured at the location in the absorbent 100 just above the piezometric surface 117 of the fluid 50 can be assumed to correspond to 100% saturation. Signal intensity measured at other locations in the absorbent 100 can be normalized with respect to the signal intensity corresponding to 100% saturation.

Figure 4:
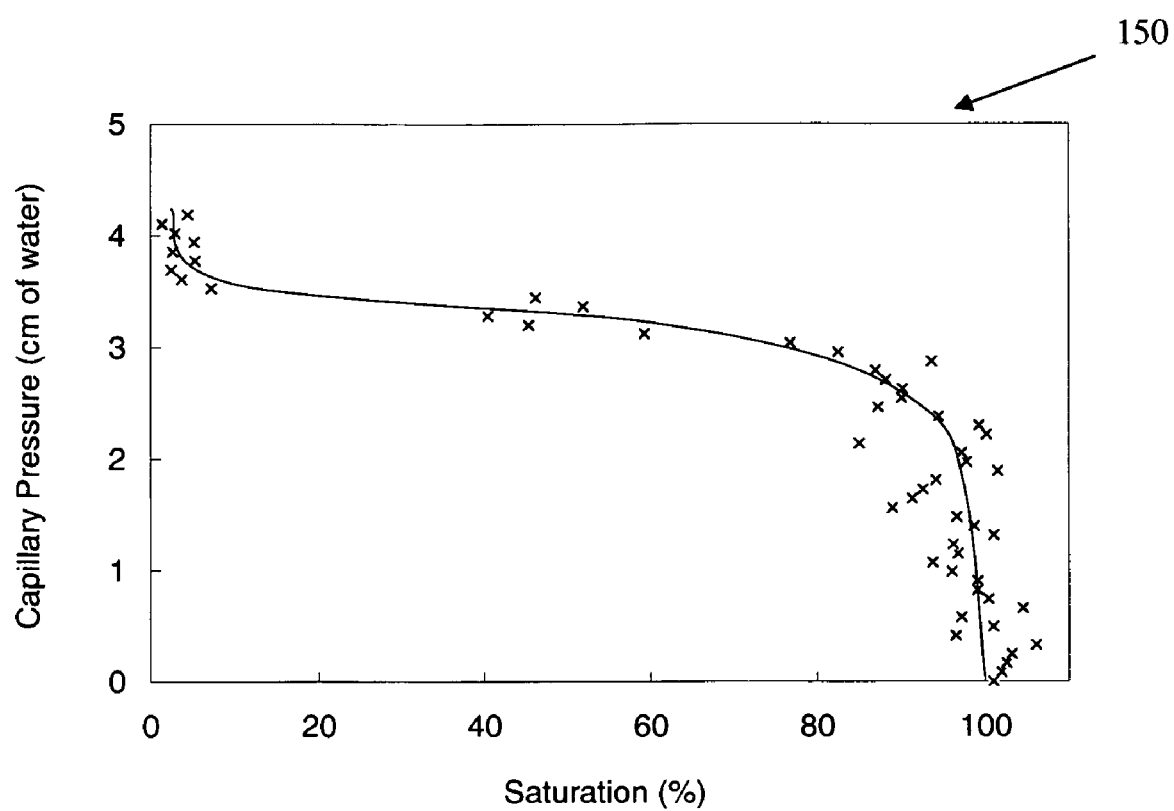
FIG. 4 is a map of saturation.

By this process a physical spatial map of saturation 150 of a fluid 50 within an absorbent 100 in a physical test environment 20 as a function of location above piezometric surface 117 of the fluid 50 along a specific line can be created for each proton image 130 recorded. A typical physical spatial map of saturation 150 measured in the physical test environment 20 collected using the method is shown in FIG. 4.

X-ray imaging can also be used to spatially map saturation of a fluid within an absorbent in a physical test environment 20. X-ray imaging can be used to quantify fluid distribution as measured from either a top view or a side view. The X-ray imaging device can be operated at around 40 kv for a top view of the absorbent 100 and around 60 kv for a side view of the absorbent 100. Optimal power setup will be adapted from case to case, depending on the absorbent 100 and the quantity of fluid in the absorbent 100. X-ray imaging produces a grey level image. The image can be transformed into a spatial map of saturation 150 in the same manner as images gathered from an NMR spectroscopy device, with the alteration that grey level corresponds to saturation. Alternatively, an X-ray image of the absorbent 100 prior to wetting can be taken to provide a base-line for the grey level corresponding to zero saturation. To enhance the image gathered by X-ray imaging, a saline solution at 0.9% can be used or another fluid having a density different from that of the absorbent 100 can be used. For an X-ray image taken from a top view, a 175 mm by 50 mm sample of absorbent 100 can be used. Fluid can be applied to the center of the absorbent 100 and X-ray images can be recorded after about 2 minutes.

A suitable X-ray imaging device is a SIGNATURE ANALYSIS (SA) available from LIXI, Inc., Huntley, Ill. Alternatively, a LIXI PROFILER in-line system can be used.

The physical spatial map of saturation 150 measured in the physical test environment 20 as a function of location above the piezometric surface 117 of the fluid 50 corresponds directly with the capillary pressure versus saturation function, where capillary pressure is the wicking height of the absorbed fluid 50 above the piezometric surface 117 of the fluid 50. The capillary pressure versus saturation function is commonly referred to as the capillary pressure function. The physical spatial map of saturation 150 can be thought of in terms of a map or graph of saturation as a function of capillary pressure, or more generally, a data file that lists the saturation of the absorbent for particular capillary pressures.

If water is used in the physical test environment 20, capillary pressure may be recorded in units of centimeters of water. If a fluid other than water is used, capillary pressure in terms of that particular fluid can be converted to units for water based on the ratio of density of the fluid tested to the density of water.

Many modern absorbent articles are comprised of multiple layers of different absorbent materials. Some absorbents are comprised of multiple layers of different absorbent materials. Separating multiple layered absorbents can be impractical because separation of the layers can cause changes in the porous structure of the material, thereby causing changes in the partially saturated properties. For instance, mechanical entanglement is sometimes used to bond two or more absorbent materials into a single absorbent. The entanglement process may alter the partially saturated properties of one or more of the individual layers. Furthermore, the partially saturated properties of the interface between two or more absorbent materials can be of interest because the interfacial properties can be different from the partially saturated properties of the materials away from the interface. Thus, measurements of the partially saturated properties of an individual layer of material may not be representative of the properties of the material in the finished absorbent article.

Similarly, sometimes it is impractical to manufacture each layer individually and test each layer because some layers do not have sufficient coherency to maintain their structure without a stronger layer to support the material. In some sense, the stronger layer acts as the carrier for the weaker layer. Physical testing of multilayered absorbent materials can be challenging because the effects of individual layers and the means by which layers are joined on absorption and desorption of fluid may not be able to be isolated.

Figure 5:
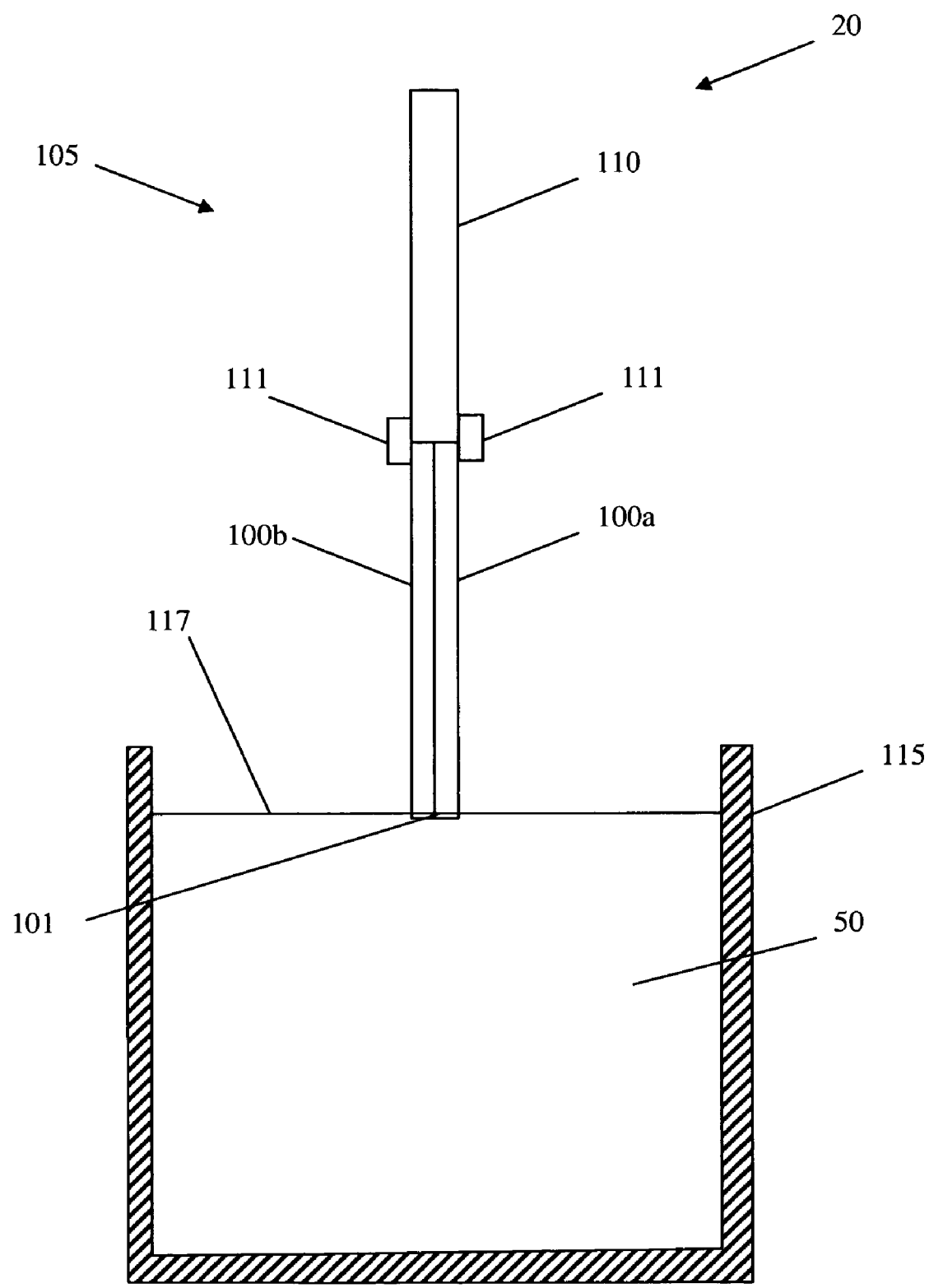
FIG. 5 is a physical test environment test apparatus for an absorbent comprised of multiple layers.

The approach described herein can also be used to generate a physical spatial map of saturation of an absorbent comprised of multiple layers. An illustration of a suitable arrangement of the testing apparatus 105 is shown in FIG. 5. For an absorbent comprised of more than one layer, such as a carrier layer 100a and a support layer 100b, the proton image 130 is taken from a perspective from which both layers of the absorbent can be viewed. A vertical line on each proton image for each layer of the absorbent can be established and the signal intensity as a function of location can recorded in a data file for each layer of the absorbent and each proton image collected. Using the same processes as described previously for a single layer, the piezometric surface 117 of the fluid 50 in the reservoir of fluid 115 is identified, the zero point is specified, and the signal corresponding to 100% saturation is determined for each layer of material. The signal intensity measured at other locations in each layer is normalized with respect to the signal for 100% saturation for that absorbent material to produce a spatial map of saturation as a function of location along a selected line for one or more layers of the absorbent for each image recorded. Using this approach, a physical spatial map of saturation 150, like that shown in FIG. 4, can be created one or more individual layers of the absorbent.

A computer model can be used to generate a virtual spatial map of saturation of fluid 50 within an absorbent 100 in a virtual test environment 22. The virtual test environment 22 can be a computer model in which for solving an equation that characterized fluid movement in a partially saturated material. The virtual test environment 22 can be a computer model in which Richards' equation for partially saturated isothermal flow can be solved. Richards' equation describes fluid saturation as a function of time and position in a partially saturated porous media (see Richards, L. A. (1931), "Capillary Conduction of Liquids through Porous Mediums," *Physics,* 1, 318-333). Richards' equation can be solved using numerical methods known to those skilled in the art including, but not limited to, finite element method, finite difference method, finite volume method, quasi-analytical methods, boundary element method, and mixed methods combining two or more numerical method techniques.

The virtual test environment 22 is designed to correspond to the test used to spatially map saturation in the physical test environment 20. The relative permeability of the absorbent 100 as a function of capillary pressure and/or saturation can be determined by comparing the virtual spatial map of saturation predicted in the virtual test environment 22 to the physical spatial map of saturation 150 measured in the physical test environment 20 and altering one or more of the absorbent-fluid interaction properties 48 for the absorbent used in the virtual test environment 22, until the spatial maps of saturation compare favorably. For absorbent materials comprised of multiple layers, the virtual test environment 22 is for a multiple layered absorbent material.

The virtual test environment 22 can be created using the TOUGH2 simulation program or algorithms for solving differential equations like Richards' equation. TOUGH2 is a general-purpose numerical simulation program for non-isothermal flows of multi-component, multi-phase fluid and heat flow in one, two, and three-dimensional porous and fractured media. It belongs to the MULKOM family of codes, developed in the Earth Sciences Division of Lawrence Berkeley National Laboratory for applications in geothermal reservoir engineering, nuclear waste disposal, and unsaturated zone hydrology. The source code for TOUGH2, written in standard FORTRAN77, is available from the Energy Science and Technology Software Center (ESTSC) of the U.S. Department of Energy (see Pruess et al. (1999), "TOUGH2 User's Guide, Version 2.0," Earth Sciences Division, Lawrence Berkeley National Laboratory, University of California, Berkeley, Calif.). Other codes, including FEFLOW®, available from WASY GmbH Institute for Water Resources Planning and Systems Research Berlin-Bohnsdorf, Germany, are also suitable.

The TOUGH2 saturated-unsaturated flow module EOS9 can be used to create the virtual test environment 22. In the TOUGH2 EOS9 saturated-unsaturated flow module, a single fluid phase is analyzed and the gas phase is treated as a passive bystander at constant pressure. The absorbent 100 can be considered to be in an isothermal state. Thereby, only a single mass balance equation for the fluid phase needs to be solved for each volume element.

Input data files for TOUGH2 can be created using a basic text editor or a more sophisticated program designed to create input data files. Input into TOUGH2 is provided in a fixed format and standard System International units such as meters, seconds, kilograms, centigrade, and corresponding derived units such as Newtons, Joules, and Pascals.

For fluid flow in an absorbent material, the continuity equation can be written as follows:

$$\vec{\nabla} \cdot \vec{J} + \phi \frac{\partial S}{\partial t} = 0$$

where J is the fluid flux, $\phi$ is the porosity of the absorbent 100, S is the fluid saturation, and t is time. In capillary-flow theory, the fluid flux is considered to be governed by Darcy's law:

$$\vec{J} = -\frac{k k_r}{\mu} \left( \vec{\nabla} P_{cap} - \rho \vec{g} \right)$$

where k is the intrinsic permeability (e.g., saturated permeability), $k_r$ is the relative permeability, $\mu$ is the fluid viscosity, $P_{cap}$ is the capillary pressure, $\rho$ is the fluid density, and g is the gravitational constant.

To solve the fluid flux equation in partially saturated porous media, constitutive equations describing the relative permeability and capillary pressure as functions of saturation are needed. These constitutive relationships are among the absorbent-fluid interaction properties 48 for the absorbent 100.

The capillary pressure versus saturation function for the absorbent 100 can be characterized using a modified van Genuchten function having the following form (van Genuchten, M. T. (1980), "A Closed-Form Equation for Predicting the Hydraulic Conductivity of Unsaturated Soils," *Soil Science Society of America*, 44, 892-898):

$$P_{cap} = -P_0 \left( S^{*\left(-\frac{1}{m}\right)} - 1 \right)^{\left(\frac{1}{n}\right)}$$

where $P_o$, m, and n are parameters defining the shape of the capillary pressure versus saturation function. S* is defined by the relationship:

$$S^* = \frac{S_l - S_{lr}}{S_{ls} - S_{lr}}$$

where $S_l$ is the actual fluid saturation, $S_{lr}$ is the irreducible fluid saturation, and $S_{ls}$ is the maximum fluid saturation. The absorbent-fluid interaction properties 48 for the absorbent 100 include $P_o$, m, n, $S_{ls}$, and $S_{lr}$. The parameters, $P_o$, m, n, $S_{ls}$, and $S_{lr}$ can be determined by curve-fitting the modified van Genuchten function for capillary pressure versus saturation to the experimental data obtained in the physical test environment 20 reported in the physical spatial map of saturation 150. The capillary pressure versus saturation function is commonly referred to as the capillary pressure function.

Curve-fitting can be performed using any means known to those skilled in the art including, but not limited to, RETC (van Genuchten, M. T., Leji, F. J., and Yates, S. R., (1991), "The RETC Code for Quantifying the Hydraulic Functions of Unsaturated Soils, Version 1.0," EPA Report 600/2-91/065, U.S. Salinity Laboratory, U.S.D.A., A.R.S., Riverside, Calif.), customized least squares regression method (e.g., FORTRAN subroutine), commercial non-linear regression software (e.g., JMP available from SAS Institute Inc., Cary, N.C. and MAPLE available from MAPLESOFT, Ontario, Canada), and customized commercial optimization algorithms (e.g., MAPLE).

The capillary pressure is constrained by the following limitation:

$$-P_{max} \leq P_{cap} \leq 0$$

where $P_{max}$ is the maximum capillary pressure that can be sustained in the absorbent 100.

Directly measuring the relative permeability as a function of saturation, commonly referred to as the relative permeability function, can be challenging. Inverse simulation can be used to establish the relative permeability function. The van Genuchten-Mualem model can be used to describe the relative permeability function (see van Genuchten, M. T. (1980), "A Closed-Form Equation for Predicting the Hydraulic Conductivity of Unsaturated Soils," *Soil Science Society of America*, 44, 892-898 and Mualem, Y. (1976), "A New Model for Predicting the Hydraulic Conductivity of Unsaturated Porous Media," *Water Resources Research*, 12(3), 513-522). The van Genuchten-Mualem model is:

$$k_r = \sqrt{S^*} \left[ 1 - \left(1 - [S^*]^{\frac{1}{\lambda}}\right)^\lambda \right]^2$$

where $\lambda$ is a fitting parameter that is partially descriptive of the shape of the relative permeability function. The parameter $\lambda$ is also one of the absorbent-fluid interaction properties 48 for the absorbent 100.

The relative permeability is defined as:

$$k_r = \frac{k_{S^*}}{k}$$

where $k_s^*$ is the permeability at a particular S* and k is the intrinsic permeability (e.g., saturated permeability). Typically, the parameter $\lambda$ is the unknown for which a value is sought because the parameters $P_o$, m, n, $S_{ls}$, and $S_{lr}$ can be determined by curve fitting the modified van Genuchten capillary pressure versus saturation function to the physical spatial map of saturation 150.

The saturated permeability of an absorbent 100 can be directly measured in the laboratory. The in-plane and thru-plane saturated permeability can be measured using any means known to those skilled in the art including, but not limited to, constant hydrostatic pressure head method, and constant volume flow rate method. The saturated absorbent 100 can be subjected to a constant hydrostatic pressure head from a column of fluid about 1 to about 100 cm in height. The preferred column height range is from about 5 to about 50 cm. The material can be held in place solely by the hydrostatic pressure head of the fluid or with additional confining pressure. The mass flow rate of fluid through absorbent 100 is recorded for a set period of time. The mass flow rate is used to calculate the saturated permeability of the absorbent 100, knowing the area of the absorbent 100 orthogonal to the direction of flow, the thickness of the absorbent 100 in a direction in-plane with the direction of flow, and the change in total pressure head across the absorbent 100.

Figure 6:
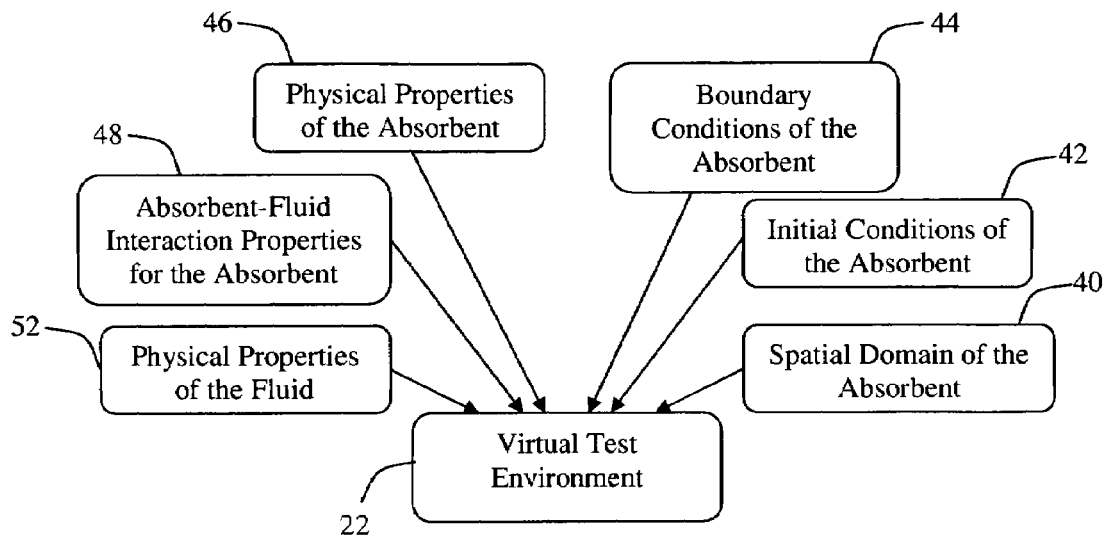
FIG. 6 is a schematic of a virtual test environment.

The virtual test environment 22 is designed to correspond to the test used to spatially map saturation in a physical test environment 20. FIG. 6 is a schematic of the components of the virtual test environment 22. The spatial domain of the absorbent 40 is specified and is discretized into suitable volume elements, which taken together form what is commonly referred to as the mesh. The mesh can be coarse or fine, the choice of which requires consideration of the computing time for the virtual test environment 22 and the precision of results. A suitable coarseness or fineness can be determined by trial and error.

Representative initial conditions of the absorbent 42 are also specified. The initial conditions of the absorbent 42 can be the same throughout the entire absorbent 100 or vary spatially. Initial saturation can be assumed to be zero, which is representative of an absorbent 100 devoid of fluid. Alternatively, the absorbent 100 in the virtual test environment 22 can be assumed to have an initial saturation that is not zero. A non-zero initial saturation can be representative of an absorbent 100 that has absorbed fluid even in ambient conditions. Ambient conditions are the conditions of the absorbent 100 prior to exposure to an insult of fluid.

Representative physical properties of the absorbent 46, including porosity, are also specified. Porosity of the absorbent can be obtained from the capillary pressure versus saturation function (or data), computed using mass/volume/density relationships, measured using a column test, determined from image interpretation, or any other method known to those skilled in the art.

Representative boundary conditions of the absorbent 44 are prescribed for the virtual test environment 22. An extremely large reservoir, orders of magnitude larger than the largest volume element, can be used to represent the reservoir of fluid 115 and fluid 50 in the test used to spatially map saturation in the physical test environment 20. The connectivity among volume elements, i.e., the spatial relationship among the volume elements, and the permeability between each volume element are also specified. Anisotropic conditions can be analyzed using TOUGH2.

Representative absorbent-fluid interaction properties 48 for the absorbent 100 and physical properties of the fluid 52 are also specified and include the fluid density, fluid viscosity, and fluid surface tension. If the modified van Genuchten constitutive relationship for the capillary pressure versus saturation function is used, the parameters $P_o$, m, n, $S_{ls}$, and $S_{lr}$, as determined above, are input. An initial estimate of the fitting parameter $\lambda$, used in the van Genuchten-Mualem constitutive relationship for relative permeability as a function of saturation, can also be input.

To implement the non-linear solver subroutine in TOUGH2, the solver conditions and convergence criteria are specified. The start time, end time, maximum time-step, and initial time-step are also input. The gravitational acceleration constant, reference temperature, and reference pressure are also input into the solver data set.

The equations describing the virtual test environment 22 can be solved using direct methods, iterative methods, or any other methods known to those skilled in the art. For some virtual test environments, the matrix of equations describing the virtual model may need to be preconditioned so that a solution meeting the specified convergence criteria is obtained. Trial and error can be used to determine if preconditioning is required. As part of the TOUGH2 input, convergence criteria and stability parameters are input to control the virtual test environment 22. The convergence criteria and stability parameters input can be selected on a trial and error basis. As with most numerical solution approaches, there can be some trade-off between the criteria selected to control the virtual test environment 22 and the time required for solution and precision of results.

When TOUGH2 is executed, TOUGH2 creates output files as specified by the output controls. The output controls specify which time-steps output files are to be generated and what information is to be reported with each output file. Output from the virtual test environment 22 can comprise fluid saturation as a function of time and position. For each time-step that output data is generated, the saturation and capillary pressure for each cell can be reported.

The absorbent-fluid interaction properties 48 for the absorbent such that the virtual spatial map of saturation approximates the physical spatial map of saturation are identified in step 24'. The virtual test environment 22, can be used to generate a virtual spatial map of saturation as a function of location above an extremely large reservoir for the virtual absorbent as a function of time. The virtual absorbent can be thought of as the absorbent 100 as conceptualized in the virtual test environment 22. For an absorbent 100 comprised of multiple layers, each layer can be evaluated independently of any other layer. The virtual spatial map of saturation from the virtual test environment 22 at a particular time is compared to the physical spatial map of saturation 150 measured in the physical test environment 20 for a corresponding time step. If the maps of saturation compare favorably, the absorbent-fluid interaction properties 48 for the absorbent used in the virtual test environment 22 are assumed to be representative of the absorbent 100 tested in the physical test environment 20.

If the virtual spatial map of saturation differs significantly from the physical spatial map of saturation 150 measured in the physical test environment 20 at a particular time, revised estimates of the absorbent-fluid interaction properties 48 for the absorbent can be made. If the van Genuchten-Mualem model is used and the parameters related to the modified van Genuchten capillary pressure versus saturation function ($P_o$, n, m, $S_{ls}$, and $S_{lr}$) are acceptable, the estimate of the parameter $\lambda$ can be revised. The virtual test environment 22 can be executed again, using a revised estimate of $\lambda$ and the virtual spatial map of saturation can again be compared with the physical spatial map of saturation 150 measured in the physical test environment 20. The steps of spatially mapping saturation in the virtual test environment 22, comparing the virtual spatial map of saturation with the physical spatial map of saturation 150 in the physical test environment 20, and adjusting $\lambda$ can be performed iteratively until the virtual spatial map of saturation compares favorably with the physical spatial map of saturation 150 measured in the physical test environment 20. The appropriate value of $\lambda$ is assumed to be that which when input into the virtual test environment 22 results in a virtual spatial map of saturation that compares favorably with the physical spatial map of saturation 150 measured in the physical test environment 20.

Another approach for determining $\lambda$ is to conduct a series of simulations in the virtual test environment 22 with each simulation having a different value for $\lambda$. Using this approach, a family of virtual spatial maps of saturation is produced based on results from the simulations in the virtual test environment 22. Then the virtual spatial map of saturation produced from a simulation in the virtual test environment 22 that compares favorably with the physical spatial map of saturation 150 measured in the physical test environment 20 is identified. The value of $\lambda$ is determined to be that when input into the virtual test environment 22 results in a virtual spatial map of saturation that compares favorably with the physical spatial map of saturation 150 in the physical test environment 20.

Another approach to determining λ is inverse modeling.

One skilled in the art will be familiar with rational means for comparing a physical spatial map of saturation 150 measured in the physical test environment 20 to a virtual spatial map of saturation generated in a virtual test environment 22 to identify maps that compare favorably. For example, least squares error or other mathematically rigorous techniques may be used as the basis for comparing two maps. Alternatively, the maps of saturation may be compared "by eye." One skilled in the art will recognize that the time and effort required to minimize the least squares error or some other mathematically describable error may not be justified given the uncertainty in measurements of the map of saturation in the physical test environment 20 and the ultimate performance of an absorbent article in which the absorbent 100 is used. Furthermore, uncertainty in the virtual model of the absorbent article 26 used to determine the performance of a feature of the absorbent article may outweigh the precision gained in using a mathematically rigorous approach for comparing two maps of saturation.

Each absorbent material in an absorbent article can be tested in a similar manner to identify the absorbent-fluid interaction properties 48 of the materials comprising the absorbent article.

Once absorbent-fluid interaction properties 48 of the absorbent materials comprising the absorbent article are known with a sufficient degree of precision, the absorbent-fluid interaction properties 48 for the absorbent materials can be input into a virtual model of the absorbent article to produce a representation of the at least one feature of the absorbent article.

Like the virtual test environment 22, the virtual model of the absorbent article 26 can be a computer model in which Richards' equation for partially saturated isothermal flow can be solved. TOUGH2, which uses a numerical solution to solve Richards' equation, can be used to create the virtual model of an absorbent article 26 for analyzing transport of fluid in an absorbent article. The virtual model of an absorbent article 26 can analyze transport of a fluid in one, two, or three dimensions.

The virtual geometry of absorbent articles, such as sanitary napkins, tampons, diapers, and incontinence products, can be created using commercial solid modeling software such as Solid Edge®, available from Solid Edge UGS, Plano, Tex., and Solid Works®, available from SolidWorks, Concord, Mass., or any other method known to those skilled in the art.

Figure 7:
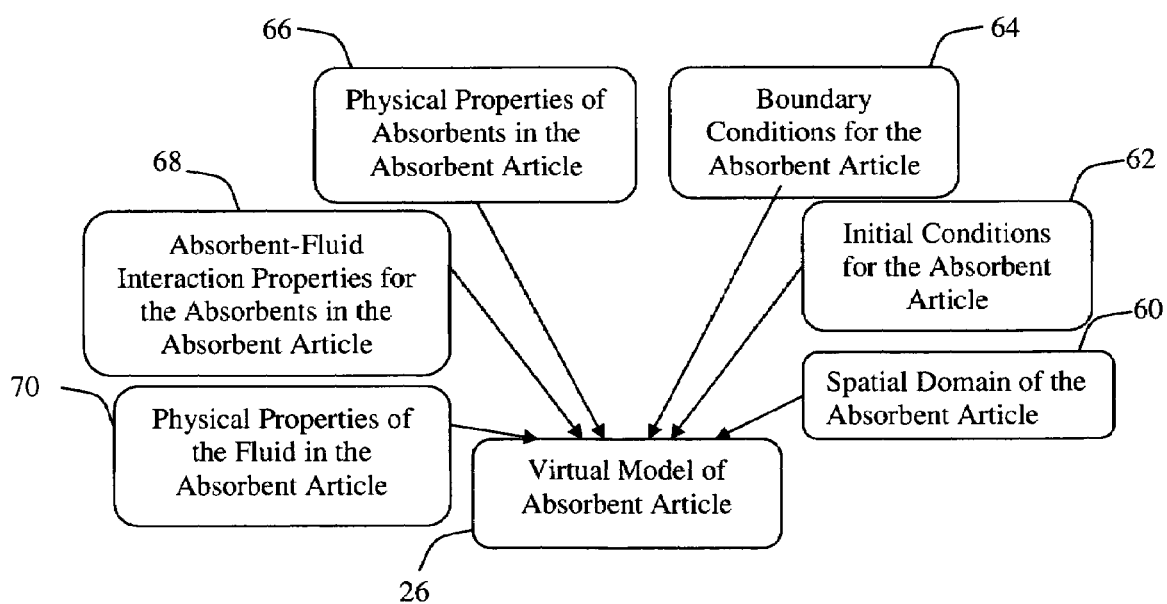
FIG. 7 is a schematic of a virtual model of an absorbent article.

FIG. 7 is a schematic of the components of a virtual model of an absorbent article 26. To virtually model absorbent articles having complex shapes, the absorbent article can be conceptually discretized into multiple volume elements. The volume elements, when assembled, form a mesh which can be referred to as the spatial domain of the absorbent article 60. The mesh can be created using any technique known to those skilled in the art including, but not limited to, conformal meshing, algebraic mesh generation schemes, and by solving partial differential equation schemes. For absorbent articles, the mesh can be uniform or non-uniform within a single layer structure. For symmetric absorbent articles, only a single section of the absorbent article may need to be virtually modeled. As with most numerical models, the user must weigh and consider the tradeoffs between the amount of computing time required, fineness of the mesh, and precision of results.

Physical properties of the absorbents in the absorbent article 66 are also specified for the virtual model of an absorbent article 26. The physical properties of the absorbents in the absorbent article 66 can be obtained from direct measurements of the properties, indirect measurements, inverse modeling, curve-fitting, material property databases, estimation, and/or any other method known to those skilled in the art. Porosity of the absorbent materials can be obtained from the capillary pressure versus saturation function (or data), computed using mass/volume/density relationships, measured using a column test, determined from image interpretation, or any other method known to those skilled in the art.

The absorbent-fluid interaction properties for the absorbents in the absorbent article 68 are also specified for the virtual model of an absorbent article 26. The absorbent-fluid interaction properties for the absorbents in the absorbent article 68 can be the modified van Genuchten parameters for the capillary pressure versus saturation function and the van Genuchten-Mualem parameters for the relative permeability function for each absorbent material in the absorbent article. These parameters can be determined as discussed previously.

The TOUGH2 saturated-unsaturated flow module EOS9 can be used to virtually model an absorbent article. Other codes, including FEFLOW®, available from WASY GmbH Institute for Water Resources Planning and Systems Research Berlin-Bohnsdorf, Germany, are also suitable for virtually modeling an absorbent article. The initial conditions for the absorbent article 62 are input into the virtual model of an absorbent article 26. The initial conditions for the absorbent article 62 include the initial saturation of each volume element in the virtual model of the absorbent article 26. Initial saturation can be assumed to be zero, which is representative of an absorbent article devoid of fluid. Alternatively, the virtual model of the absorbent article can be assumed to have an initial saturation that is not zero. A non-zero initial saturation can be representative of an absorbent article 26 that has absorbed fluid even in ambient conditions. The initial saturation may vary throughout the absorbent article.

The boundary conditions for the absorbent article 64 are also specified for the virtual model of an absorbent article 26. Boundary conditions for the absorbent article 64 can include one or more fluid sources. Boundary conditions for the absorbent article 64 can also be specified to model surface-fluid and/or surface tension effects.

The initial saturation of each fluid source element can be specified as a function of time. The physical properties of the fluid in the absorbent article 70 are also specified and include the fluid density, fluid viscosity, and fluid surface tension.

The equations describing the virtual model of an absorbent article 26 can be solved using direct methods, iterative methods, or any other methods known to those skilled in the art. For some virtual models of absorbent articles, the matrix of equations describing the virtual model may need to be pre-conditioned so that a solution meeting the specified convergence criteria is obtained. As part of the TOUGH2 input, convergence criteria and stability parameters are input to control the virtual model of an absorbent article 26. The convergence criteria and stability parameters input can be selected on a trial and error basis. As with most numerical solution approaches, there can be some trade-off between the criteria selected to control the virtual model of the absorbent article 26 and the time required for solution and precision of results.

Output from the virtual model of an absorbent article can comprise fluid saturation as a function of time and position. The output controls in TOUGH2 specify which time-steps output is generated by TOUGH2.

Based on results from simulations conducted using the virtual model of the absorbent article 26, the virtual model of the absorbent article can be evaluated to determine the performance of the at least one feature of the absorbent article in step 28'. The at least one product feature of the absorbent article can be absorbency. Absorbency can be characterized by the location of the saturation front at a particular time step. The saturation front can be arbitrarily identified as being a particular degree of saturation such as 75%. The at least one product feature of the absorbent article can be stain size or stain volume for an insult of fluid, which is another way to characterize absorbency. For an absorbent article such as a sanitary napkin, the stain size or stain volume can be characterized as the area or volume of the absorbent article bounded by the saturation front. The stain size for a sanitary napkin can be visualized as the surface area of the sanitary napkin that would be heavily stained by menses when a sanitary napkin is worn by a menstruating woman. The stain volume for a sanitary napkin can be visualized as the volume of absorbent in which menses in excess of a particular saturation can be found. Stain volume is another way to characterize absorbency. The at least one product feature of the absorbent article can be the rate of fluid uptake, which is another way to characterize absorbency. The rate of fluid uptake can be computed based on the fluid saturation at two or more times. Visualization software such as FIELDVIEW, available from Fieldview Intelligent Light, Rutherford, N.J., and ENSIGHT, available from Ensight CEI, Apex, N.C., can be useful as an aid to a designer analyzing output from a virtual model of an absorbent article.

Based on the evaluation of results from simulations conducted using the virtual model of the absorbent article 26, decisions can be made on how to improve the performance of the absorbent article by modifying the design of the absorbent article in step 30'. These decisions can be incorporated into an alternative design for the absorbent article and the alternative design can be tested using a virtual model of an absorbent article embodying the alternative design.

For example, results from the virtual model of an absorbent article 26 may indicate that the rate of fluid uptake in an absorbent core of a sanitary napkin is insufficient to meet the designer's performance expectations. The designer can then modify the design of the absorbent article by specifying that the absorbent core have a different relative permeability. After modifying one or more characteristics of the absorbent article, the modified design can be tested using a virtual model of the absorbent article. In this manner, the designer can iteratively develop new designs, make predictions of performance, alter the design based on the predicted performance, and retest the performance of the absorbent article, all using a virtual model of an absorbent article 26. The designer can continue this process of refining the design until the design meets performance expectations.

Alternatively, steps 26', 28', and 30' can be performed iteratively by a software program developed in FORTRAN, C++, or similarly sophisticated programming language. If the absorbent-fluid interaction properties 48 for the absorbents are already known at the beginning of the design process, steps 26', 28', and 30' can be used as a method for designing an absorbent article. If a designer desires to evaluate a modified design, the steps 26' and 28' can be repeated.

Figure 8:
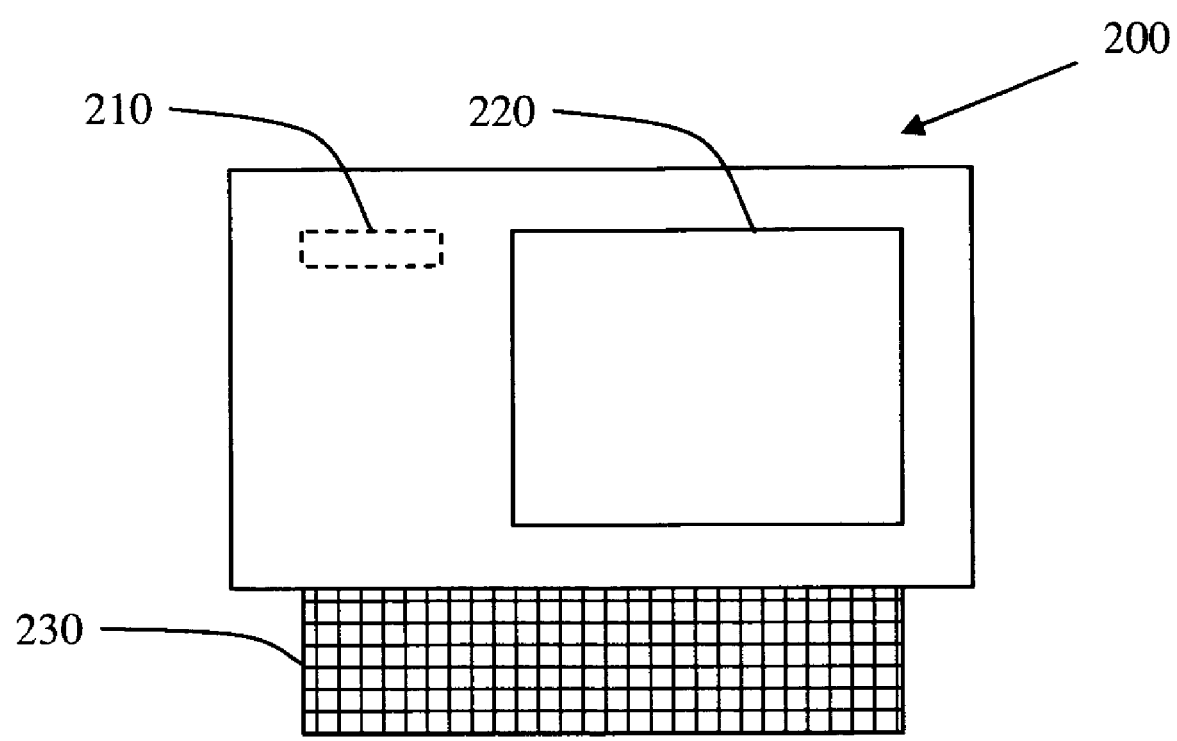
FIG. 8 is a block diagram illustrating one example of a computer system for operating the virtual test environment and operating the virtual absorbent article.

FIG. 8 is a block diagram illustrating one example of a computer system 200 for operating the virtual test environment 22 and the virtual model of an absorbent article 26. The computer system 200 comprises a central processing unit 210, a graphical user interface 220 including a display communicatively coupled to the central processing unit 210, and a user interface selection device 230 communicatively coupled to the central processing unit 210. The user interface selection device 230 can be used to input data and information into the central processing unit 210. The central processing unit 210 can include or has access to memory or data storage units, e.g., hard drive(s), compact disk(s), tape drive(s), and similar memory or data storage units for storing various data and inputs which can be accessed and used in operating the virtual test environment 22 and the virtual model of an absorbent article 26. Central processing unit 210 can be part of a SUN workstation running a UNIX® operating system, part of a personal computer using INTEL® PC architecture and running a MICROSOFT WINDOWS® operating system, or part of another similarly capable computer architecture and accompanying operating system.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

All documents cited in the Detailed Description of the Invention are, in relevant part, incorporated herein by reference; the citation of any document is not to be construed as an admission that it is prior art with respect to the present invention. To the extent that any meaning or definition of a term in this written document conflicts with any meaning or definition of the term in a document incorporated by reference, the meaning or definition assigned to the term in this written document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method for designing an absorbent article, the method comprising:

generating a physical spatial map of saturation of a fluid within an absorbent in a physical test environment;

generating a virtual spatial map of saturation of a fluid within an absorbent in a virtual test environment;

identifying absorbent-fluid interaction properties for the absorbent such that the virtual spatial map of saturation approximates the physical spatial map of saturation, wherein the absorbent-fluid interaction properties are selected from the group consisting of the capillary pressure versus saturation function, relative permeability function, saturated permeability, irreducible fluid saturation, and maximum fluid saturation;

inputting the absorbent-fluid interaction properties for the absorbent into a virtual model of the absorbent article to produce a representation of at least one feature of the absorbent article;

evaluating the virtual model of the absorbent article to determine the performance of the at least one feature of the absorbent article; and modifying the design of the absorbent article in response to the performance of the at least one feature of the absorbent article determined from the virtual model of the absorbent article.

2. A method according to claim 1, further comprising the step of:

inputting the absorbent-fluid interaction properties into a virtual model of the absorbent article having a modified design and re-performing the step of evaluating the virtual model of the absorbent article to determine the performance of the at least one feature of the absorbent article.

3. A method according to claim 1, wherein the physical spatial map of saturation is generated with measurements made using a noninvasive technique.

4. A method according to claim 1, wherein the physical spatial map of saturation is generated with measurements made using nuclear magnetic resonance spectroscopy.

5. A method according to claim 1, wherein the physical spatial map of saturation is generated with measurements made using a technique selected from the group consisting of X-ray imaging, autoporosimetry and gravimetric analysis.

6. A method according to claim 1, wherein the capillary pressure versus saturation function is characterized using a modified van Genuchten function.

7. A method according to claim 1, wherein the relative permeability function is characterized using a van Genuchten-Mualem model.

8. A method according to claim 1, wherein the fluid is water.

9. A method according to claim 1, wherein the fluid is selected from the group consisting of artificial menstrual fluid, menstrual fluid, synthetic vaginal discharge, vaginal discharge, synthetic urine, urine, fluid from a bowel movement, bowel movement analog, sweat, and synthetic sweat.

10. A method according to claim 1, wherein the fluid is selected from the group consisting of a substance used for skin care, a lubricant, a surfactant, a cleanser, a detergent, a beverage, a petroleum product, a solvent, and vomit.

11. A method according to claim 1, wherein the absorbent article is a catamenial device.

12. A method according to claim 11, wherein the catamenial device comprises a topsheet, a backsheet, and an absorbent core disposed between the topsheet and backsheet.

13. A method according to claim 1, wherein the absorbent article is a diaper.

14. A method according to claim 1, wherein the absorbent article dispenses a substance.

15. A method according to claim 1, wherein the absorbent article is selected from the group consisting of pull-on diapers, training pants, incontinence products, feminine wipes, diaper wipes, floor wipes, countertop wipes, body wipes, toddler wash wipes, bath tissues, breast pads, paper towels, toilet paper, facial tissue, wound dressings, handkerchiefs, household wipes, foam, and chamois.

16. A method according to claim 1, wherein the steps of inputting the absorbent-fluid interaction properties for the absorbent into a virtual model of the absorbent article to produce a representation of at least one feature of the absorbent article, evaluating the virtual model of the absorbent article to determine the performance of the at least one feature of the absorbent article, and modifying the design of the absorbent article in response to the performance of the at least one feature of the absorbent article determined from the virtual model of the absorbent article are performed iteratively by a software program.

17. A method according to claim 1, wherein the absorbent is selected from the group consisting of nonwovens, wovens, apertured polymer films, cellulosic materials, thermoplastic materials, air laid materials, sponges, absorbent gelling materials, foams, rayon, cotton, airfelt, creped cellulose wadding, meltblown polymers, and peat moss.

18. A method for designing an absorbent article, the method comprising:
   generating a physical spatial map of saturation of a fluid within an absorbent in a physical test environment;
   identifying absorbent-fluid interaction properties for the absorbent, wherein the absorbent-fluid interaction properties are selected from the group consisting of the capillary pressure versus saturation function, relative permeability function, saturated permeability, irreducible fluid saturation, and maximum fluid saturation;
   inputting the absorbent-fluid interaction properties for the absorbent into a virtual model of the absorbent article to produce a representation of at least one feature of the absorbent article;
   evaluating the virtual model of the absorbent article to determine the performance of the at least one feature of the absorbent article; and
   modifying the design of the absorbent article in response to the performance of the at least one feature of the absorbent article determined from the virtual model of the absorbent article.

19. A method for designing a catamenial device, the method comprising:
   generating a physical spatial map of saturation of a fluid within an absorbent in a physical test environment using magnetic resonance spectroscopy;
   generating a virtual spatial map of saturation of a fluid within an absorbent in a virtual test environment;
   identifying the capillary pressure versus saturation function, relative permeability function, saturated permeability, irreducible fluid saturation, and maximum fluid saturation for the absorbent such that the virtual spatial map of saturation approximates the physical spatial map of saturation;
   inputting the absorbent-fluid interaction properties for the absorbent into a virtual model of a catamenial device to produce a representation of at least one feature of the catamenial device;
   evaluating the virtual model of the catamenial device to determine the absorbency of the catamenial device; and
   modifying the design of the catamenial device in response to the absorbency of the catamenial device determined from the virtual model of the catamenial device.

* * * * *

UNITED STATES PATENT AND TRADEMARK OFFICE
CERTIFICATE OF CORRECTION

Page 1 of 1

PATENT NO. : 7,684,939 B2
APPLICATION NO. : 11/504993
DATED : March 23, 2010
INVENTOR(S) : Mel Allende-Blanco It is certified that error appears in the above-identified patent and that said Letters Patent is hereby corrected as shown below:

Title Page; item (56);

OTHER PUBLICATIONS

Line 1, delete "2003" and insert -- 2008 --.

Signed and Sealed this
Eleventh Day of January, 2011

David J. Kappos
*Director of the United States Patent and Trademark Office*